(12) United States Patent
Tziortzis et al.

(10) Patent No.: US 9,372,532 B2
(45) Date of Patent: *Jun. 21, 2016

(54) IMAGE MAGNIFICATION BASED ON DISPLAY FLEXING

(71) Applicant: BLACKBERRY LIMITED, Waterloo, Ontario (CA)

(72) Inventors: Alek Tziortzis, Palatine, IL (US); Bashar Jano, Algonquin, IL (US); Alexander Samson Hirsch, Highland Park, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 255 days.

This patent is subject to a terminal disclaimer.

(21) Appl. No.: 13/914,237

(22) Filed: Jun. 10, 2013

(65) Prior Publication Data

US 2013/0271365 A1  Oct. 17, 2013

Related U.S. Application Data

(63) Continuation of application No. 12/942,336, filed on Nov. 9, 2010, now Pat. No. 8,462,106.

(51) Int. Cl.
*G09G 5/00* (2006.01)
*G06F 3/01* (2006.01)
*G06F 1/16* (2006.01)

(52) U.S. Cl.
CPC .............. *G06F 3/01* (2013.01); *G06F 1/1652* (2013.01); *G09G 5/005* (2013.01); *G06F 2203/04806* (2013.01); *G09G 2340/045* (2013.01); *G09G 2340/14* (2013.01); *G09G 2380/02* (2013.01)

(58) Field of Classification Search
CPC ..... G06F 3/038; G06F 3/0416; G06F 1/1652; G06F 2203/04102; G06F 2203/04806; G06F 3/0488; G06F 2203/04105; G06F 3/0412; G09G 5/005; G09G 2340/045; G09G 2340/14; G09G 2380/02; G09G 3/36; G09G 2320/0606; G09G 2320/0613

See application file for complete search history.

(56) References Cited

U.S. PATENT DOCUMENTS 6,323,846 B1   11/2001   Westerman et al. .......... 345/173
1,714,801 A1    5/2010   Kimmel
(Continued)

OTHER PUBLICATIONS

European Search Report dated Feb. 7, 2011 for European Application No. 10190451.

(Continued)

*Primary Examiner* — Towfiq Elahi
*Assistant Examiner* — Bryan Earles
(74) *Attorney, Agent, or Firm* — Jeffrey N. Giunta; Fleit Gibbons Gutman Bongini & Bianco P.L.

(57) ABSTRACT

Systems and methods control resizing a presentation of an image on a flexible display. An initial presentation of an image is provided on a flexible display. A first flexing of the flexible display away from an unflexed configuration is determined and a return of the flexible display to the unflexed configuration is determined within a defined time period after determining the first flexing. A second flexing of the flexible display away from the unflexed configuration is determined within the defined time period after determining the first flexing and after determining the return. The first flexing is separate from the second flexing. At least a portion of the initial presentation is resized in a first manner in response to determining the first flexing and in response to determining the second flexing within the defined time period after determining the first flexing.

19 Claims, 8 Drawing Sheets

(56) References Cited

U.S. PATENT DOCUMENTS

| | | |
|---|---|---|
| 2003/0098857 A1 | 5/2003 | Gettemy et al. ............. 345/173 |
| 2004/0008191 A1 | 1/2004 | Poupyrev et al. ............. 345/184 |
| 2008/0291225 A1 | 11/2008 | Arneson |
| 2010/0011291 A1* | 1/2010 | Nurmi ........................... 715/702 |
| 2010/0045705 A1 | 2/2010 | Vertegaal et al. ............. 345/661 |
| 2010/0056223 A1 | 3/2010 | Choi et al. |
| 2010/0141605 A1 | 6/2010 | Kang et al. |
| 2010/0164888 A1* | 7/2010 | Okumura et al. ............. 345/173 |
| 2010/0253646 A1 | 10/2010 | Hiratsuka ..................... 345/174 |
| 2011/0126094 A1* | 5/2011 | Horodezky et al. ........... 715/702 |

OTHER PUBLICATIONS

European Examination Report dated May 30, 3011 for EP 10190451.4.

* cited by examiner

IMAGE MAGNIFICATION BASED ON DISPLAY FLEXING

CROSS REFERENCE TO RELATED APPLICATION

This application is a continuation of U.S. patent application Ser. No. 12/942,336, entitled "Image Magnification Based on Display Flexing" filed on Nov. 9, 2010, the entire disclosure of which is incorporated by reference herein in its entirety.

FIELD OF THE DISCLOSURE

The present disclosure generally relates to modifying images presented on flexible electronic displays and more particularly to altering presented images based on the flexing of a flexible display.

BACKGROUND

Flexible or bendable electronic displays provide a user with many techniques for interacting with electronic devices. For example, users are able to provide input to an electronic device based upon flexing, such as by bending, folding, or bending and folding, the flexible display. The actions taken in response to various types of display flexing has been limited. Therefore, increasing the form and nature of user inputs detected and characterized by a flexible display and increasing the types of actions taken in response to those user inputs improves the utility and convenience of using flexible display devices.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
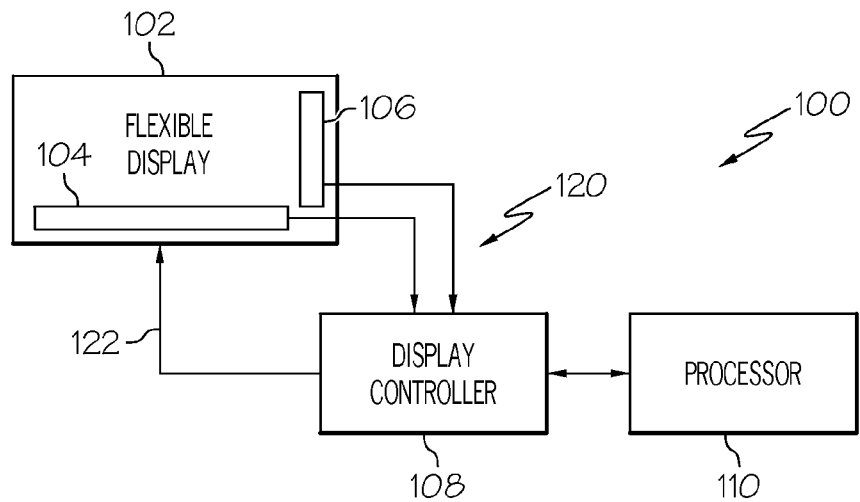
FIG. 1 is a block diagram of an electronic device in accordance with one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Described below are systems and methods that allow a user to flex, such as by bending, folding, or bending and folding, a flexible display in order to control magnification or size reduction of the image presented on the display. These methods and systems detect a user's flexing of the flexible display and respond to certain defined types of flexing by resizing a presentation of an image that is on the flexible display. The resizing can be based upon the magnitude and characteristics of display flexing. In an example, a presentation of an image is magnified by forming a convex shape with the flexible display. The presentation is reduced in size by forming a concave shape with the flexible display. The amount of magnification or size reduction of the image presented on a flexible display can increase along with the absolute magnitude of flexible display flexing relative to an unflexed configuration of the flexible display. The amount of magnification or size reduction of the presented image realized by a certain incremental amount of flexing is alternatively able to decrease as the display is increasingly flexed. The amount of image magnification or size reduction performed in response to a concave or convex flexing of the flexible display is able to increase in a linear or nonlinear manner with the total magnitude of flexing. The amount of magnification or size reduction for a given amount of flexing is able to be a continuous function of flexing magnitude, or the amount of resizing is able to change in discrete steps as a function of the degree of display flexing.

A "double flex" user input is also generated by properly flexing a flexible display to indicate that the user desires actions associated with a double flex to be taken. In an example of a "double flex" user input flexing sequence, the display is flexed, released, and then flexed again all within a defined time period. A "double flex" user input may indicate that the device should fit the presently displayed document to the width of the flexible display or that the entire document should be resized to fit on the flexible display. The direction of flexing, such as flexing in a concave or a convex direction, is a flexing characteristic that is able to also indicate other desired actions by the user. For example, a double flex in a concave direction can indicate that the currently displayed document should be resized so that the entire document is presented on the flexible display.

In addition to flexing a flexible display to cause the displayed image to be magnified or reduced in size, further examples are able to receive other commands from the user by the user's flexing the display in a manner different than the manner that indicates display magnification or size reduction. For example, flexing of the display along a horizontal line is able to be defined as a user's input to magnify the displayed image while flexing the display along a vertical line is defined as a different user input. In this example, flexing the display along a vertical line may be a user's input indicting that an e-mail address book be displayed on the flexible display.

FIG. 1 is a block diagram of an electronic device 100 in accordance with one example. The electronic device 100 is a flexible display command includes a flexible display 102. The flexible display 102 has associated flexing sensors to sense and characterize a user's flexing, such as bending, folding, or bending and folding, of the flexible display 102. The illustrated flexible display 102 includes flexing sensors such as an integral horizontal flexing sensor 104 and an integral vertical flexing sensor 106 to sense and characterize flexing of the flexible display. The flexing sensors sense and characterize flexing by determining, for example, an axis along which the flexible display 102 is flexed, a magnitude of the flexing as well as the direction of flexing. Direction of flexing is able to be, for example, a concave flexing or a convex flexing. The integral horizontal sensor 104 senses and characterizes flexing along a vertical axis of the flexible display 102. The integral vertical sensor 106 senses and characterizes flexing along a horizontal axis of the flexible display 102. Axes of flexing other than vertical and horizontal are able to be determined by combining flexing characterization data from both the integral horizontal flexing sensor 104 and the integral vertical flexing sensor 106. Further examples are able to use any suitable type of sensor to detect, characterize, or detect and characterize the flexing of the flexible display 102.

The flexible display 102 in one example is an electronically controlled display that is fabricated so as to be flexible by one or both of bending and folding. As is familiar to practitioners of ordinary skill in the relevant arts, a flexible display 102 in one example is able to be fabricated as a thin, Organic LEDs (OLEDs) arrangement that allows a user of the display to provide user input by flexing the display. Associated flexing sensors are positioned either within or in proximity to the flexible display to sense and characterize how a user flexes the flexible display 102.

A user is able to, for example, fold the flexible display 102 along a certain line across the face of the flexible display 102 in order to select a particular function. For example, an icon or other graphical indicator is able to be presented at a location within the flexible display 102 and folding the flexible display 102 along a fold line that runs through that icon selects a function associated with that icon. In addition to selecting functions represented by icons, more general user input is able to be indicated by flexing a flexible display. For example, a user input provided by flexing a flexible display in a certain manner may indicate that a displayed image should be resized by being either magnified or reduced in size.

A display controller 108 receives flexing sensor data 120 from the associated sensors of the flexible display 102, such as from the integral horizontal flexing sensor 104, the integral vertical flexing sensor 106, or both. The display controller 108 provides to the flexible display 102 display data 122 that defines a presentation of image data. The flexing sensors, including the horizontal flexing sensor 104 and the vertical flexing sensor 106, detect flexing of the flexible display 102 and characterize that flexing. Characterization of the flexing of a flexible display 102 includes determination of a location of the flexing on the flexible display 102, determination of a magnitude of the flexing, determination of a direction of the flexing, and also a determination of an axis of the flexing. The direction of flexing of a flexible display 102 includes concave flexing or convex flexing.

The display controller 108 of one example receives a characterization of flexing of the flexible display 102 from the flexing sensors. The display controller 108 determines, based on these characterizations, that the flexing is a defined flexing. A defined flexing is a particular flexing motion of the flexible display 102 with which a function is associated. The display controller 108 associates different actions with different defined flexings of the flexible display 102. An example of a defined flexing of the flexible display 102 includes bending the flexible display 102 along its vertical axis in a convex direction. In this example, the defined flexing is along a defined axis, i.e., the vertical axis, and in a defined direction, i.e., the convex direction. In response to such a defined flexing, the display controller 108 magnifies the presentation of the image on the flexible display 102.

As is described in further detail below, the display controller 108 performs processing to magnify or reduce in size at least a portion of the image presented on the flexible display 102 in response to determining that the flexing of the flexible display was a corresponding defined flexing, such as a convex or concave bending along the flexible display's vertical axis. In some examples the display controller 108 responds to flexing of the flexible display 102 along one axis, such as along the vertical axis, by magnifying or reducing in size at least a portion of the displayed image. Magnifying or reducing in size at least a portion of the displayed image is selected based upon the direction of flexing, such as concave flexing resulting in size reduction and convex flexing resulting in magnification.

In some examples, the display controller 108 associates different actions to take for flexing along different defined axes. In the example of a responding to flexing along a vertical axis by magnifying the displayed image, the display controller may respond to flexing along another defined axis, such as the horizontal axis or a diagonal axis, by displaying an e-mail address book on the flexible display 102.

A processor 110 in one example is connected to the display controller 108 to provide image data to be presented to the user. In various examples, the processor 110 is able to receive detections and characterizations of flexing of the flexible display 102. In one example, the processor 110 is then able to alter or modify all or a portion of a presentation of the image data that is presented to the user. For example, the processor 110 is able to perform some or all of the image magnification or reduction processing that is to be performed in response to various types and magnitudes of the user's flexing of the flexible display 102. The processor 110 is also able to provide higher resolution data in response to a determination that the displayed image is to be magnified in response to a user's flexing of the flexible display.

Figure 2:
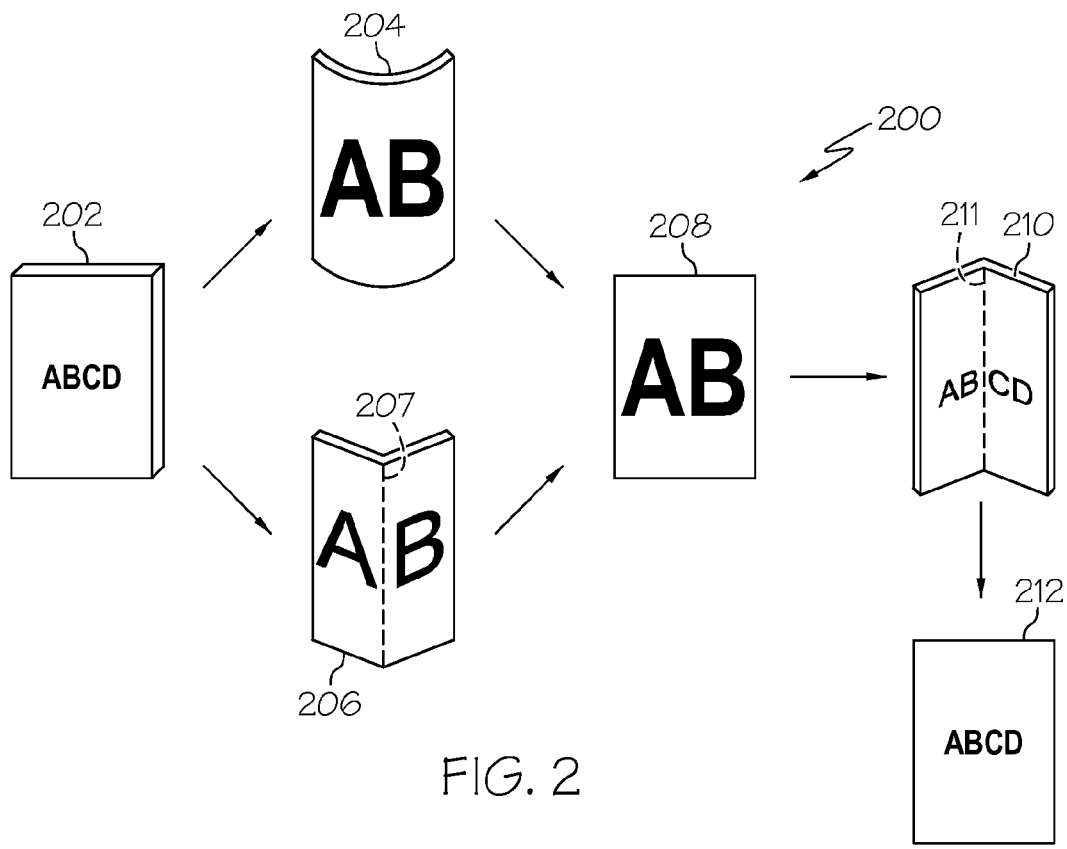
FIG. 2 illustrates a flexible display in multiple states in accordance with one example.

FIG. 2 illustrates a flexible display in multiple states 200 in accordance with one example. The flexible display in multiple states 200 shows a flexible display in multiple states of being unflexed, bent or folded. The following discussion of the flexible display in multiple states 200 references the above described electronic device 100 and the following discussion refers to the components of the electronic device 100.

The flexible display in multiple states 200 includes an initial unflexed display 202 that presents an initial presentation of an image consisting of "ABCD" to a viewer. The initial unflexed display 202 is shown in this example as a flat display for ease of understanding. Various examples are able to include flexible displays that assume any shape in an absence of user flexing or that are in a particular shape during normal use. Such normal shapes or configurations are able to be an "unflexed" configuration from which a user flexes the flexible display to provide a user input.

In one example, a user is able to bend the initial unflexed display 202 along the vertical axis to form a convex display 204 where the edges of the flexible display are further from the user than the middle of the flexible display. In this example, the convex bend of the flexible display 102 along the vertical axis is a defined flexing that causes magnification of the presentation of the displayed image. In one example, the operation of a display controller 108 receives a characterization of the flexing, which indicates the magnitude of the convex bend of the flexible display 102 along the vertical axis, from the integral horizontal flexing sensor 104. In response to receiving this characterization, the display controller 108 resizes the initial presentation of the image by magnifying the presentation of the displayed image.

In one example, the magnification of the presentation of the displayed image is increased in proportion to the amount, or the magnitude, of flexing to which the user subjects the flexible display 102. In further examples, the amount of magnification of the displayed image increases non-linearly with increasing flexing of the display, such as in a step-wise fashion or by increasing the amount of magnification for a given increasing in flexing as the total magnitude of flexing of the flexible display increases relative its unflexed configuration. The increase in magnification for a given increase of flexing is also able to alternatively decrease as the total magnitude of the flexing of the flexible display increases.

As an alternative to bending the flexible display 102, a user may fold the initial unflexed flexible display 202 along the vertical axis to create a first folded display 206. The first folded display 206 is folded along a first fold line 207 such that the edges of the flexible display 102 are pushed away from the user relative to the middle of the display. This folding of the flexible display 102 along a vertical line is an example of another defined flexing of the flexible display 102. The first folded display 206 has a sharper bend than the convex display 204 because the flexible display is folded along the first fold line 207. Since the shape of the first folded display 206 is similar to a convex shape generally associated with magnification, the presentation of the image displayed on the first folded display 206 is resized by magnifying it in a manner similar to that for the convex display 204.

Although the flexible display in multiple states 200 illustrates that the user's forming either the convex display 204 or the first folded display 206 causes a similar amount of magnification, further examples are able to perform different modifications to the presentation of the displayed image when the display is bent or folded. For example, a convex bend along the vertical axis may cause less image magnification than a fold in the same direction. In addition to bending or folding, a user is also able to flex the flexible display 102 in any suitable manner or combination that is characterized and determined to be a defined flexing to modify the displayed image or otherwise cause an action to be initiated.

Once the user has caused image magnification by a convex bend or fold, in one example the user's returning the flexible display 102 to a second unflexed display 208 causes the presentation of the image displayed on the second unflexed display 208 to retain the magnification caused by the above described convex bending or folding. Alternatively, returning the flexible display to the second unflexed display 208 is able to be defined as a "reset flexing" that causes the initial presentation of the image to be displayed in its original size as it was displayed on the initial unflexed display 202.

After the user views the display on the second unflexed display 208, the flexible display in multiple states 200 illustrates that the user is able to perform a concave fold of the display by bringing the side edges towards the user to create a second folded display 210. In one example, the user's creating the second folded display 210 is a defined reset flexing that causes the initial presentation of the image to be displayed in its original size as it was displayed on the initial unflexed display 202. After creating the second folded display 210, the user is able to return the flexible display 102 to an unflexed configuration shown as the final unflexed display 212. In the final unflexed display 212, the displayed image is the same as displayed on the second folded display 210, which is also the image displayed on the initial unflexed display 202.

Flexing a flexible display into a concave shape by either concave bending or concave folding of the flexible display is able to cause the size of the currently presented image to be reduce so that the currently displayed image will be presented on less area of the flexible display that was used. The portion of the display that is no longer used to display the presented image is able to be used to display other data. Examples of other data displayed as a result of reducing the displayed size of an image include portions of that image that extended beyond the previously displayed portion. This is similar to a "Zoom Out" function of displaying a greater portion of an image.

Figure 3:
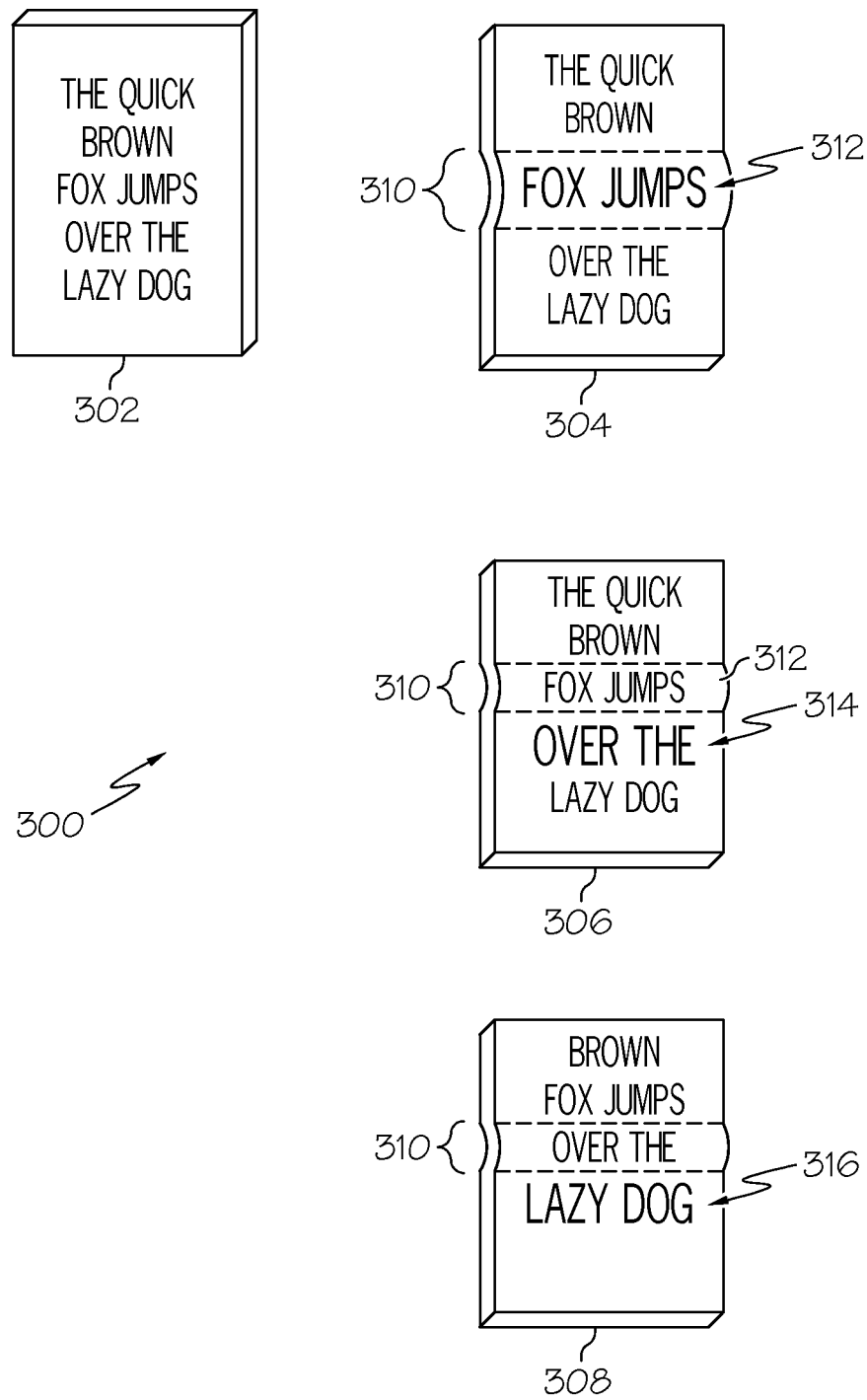
FIG. 3 illustrates display line magnification configurations in accordance with one example.

FIG. 3 illustrates display line magnification configurations 300 in accordance with one example. The display line magnification configurations 300 show an unflexed display 302 that is a flexible display in an unflexed configuration with an initial presentation of an image consisting of several lines of text. The display line magnification configurations 300 depicts examples of how an initial presentation of an image is modified, or resized, in response to a defined flexing that includes a user's bending the flexible display in a certain manner. Similar presentation modifications, resizing, or other display operations are able to be performed in response to another defined flexing, such as folding of the flexible display. The examples shown in the display line magnification configurations 300 and described below are representative of the type of bending or folding of a flexible display that a user can use to cause selected image modifications such as magnification or presentation size reduction.

A first bent display 304 shows a flexible display with a bend 310. The illustrated bend 310 forms a ridge along a horizontal portion of the flexible display and is a defined flexing associated with resizing of a portion of the initial presentation of an image. The portion of the initial presentation that is resized is less than the entirety of the initial presentation of the image. The illustrated bend 310 is one example of a defined flexing that causes the modification of the displayed image described below. In another example, a bend of the flexible display that causes the top portion of the flexible display that is above the bend to angle away from a user viewing the flexible display is also able to be a defined flexing that causes similar modification of to the initial presentation of the image.

The first bent display 304 shows that the third line 312 of the displayed text, which is the text displayed at the location of the bend 310, is magnified. The third line 312 in this example is at the location of the bend 310 and is also the portion of the initial presentation of the image that is resized in response to the defined flexing, i.e., the bend 310. The other text displayed on the flexible display form another portion of the initial presentation and is not magnified. The other displayed text aside from the third line 312 appears in its original size as is shown on the initial presentation displayed on the unflexed display 302.

A second bent display 306 depicts an alternative image modification that is performed in response to a user's bending a flexible display to create a bend 310, which is a defined flexing in this example. In the second bent display 306, a fourth line 314, which is below the location of the bend 310, is magnified while other text presented on the display retains its original size. As shown on the second bent display 306, the fourth line 314 is adjacent to and removed from the location of the bend 310. Magnifying a portion of the initial presentation of an image, such as a text line, that is below the bend of the flexible display is beneficial in some environments since text displayed on the bend may be difficult to read due to its being bent or from variable amounts of glare along the bent portion of the flexible display.

A third bent display 308 illustrates scrolling of text on a bent display. In the example of a third bent display 308, the display controller 108 receives a scrolling command and creates a presentation of a scrolled image in response thereto. The third bent display 308 illustrates a presentation of the scrolled image, which consists of text that is scrolled up by one line as compared to the initial presentation of the image displayed on the second bent display 306. As the text is scrolled up one line, the fifth line 316, which is below the bend 310 and is a scrolled portion of the presentation of the scrolled image, is magnified. In this example, the previously magnified portion, i.e., the fourth line 314, returns to its original size as was presented in the initial presentation of the image depicted on the unflexed display 302. The scrolling command is able to be received in response to various occurrences, such as an automated process determining that new data should be presented, by a user's input such as by pressing buttons or a gesture across the flexible display, or by flexing the display in a defined manner.

Figure 4:
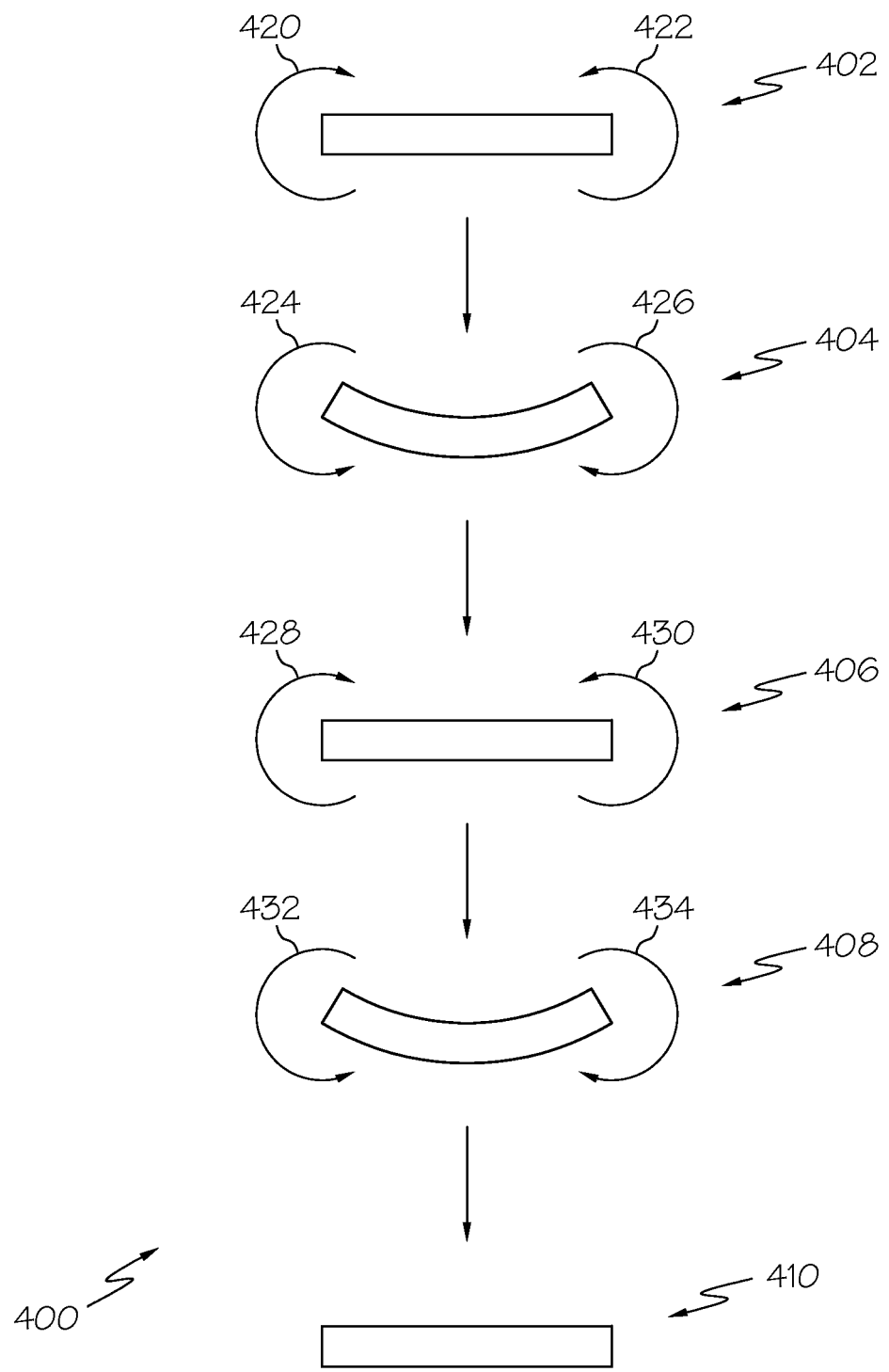
FIG. 4 illustrates a double bend flexing, in accordance with one example.

FIG. 4 illustrates a double bend flexing 400, in accordance with one example. The double bend flexing 400 is an additional user input action using a flexible display that increases the number of actions that a user is able to indicate should be taken. The double bend flexing 400 illustrates another defined flexing that is an input to select an action where the user bends a flexible display twice within a defined time period. In one example, bending a display only once in the defined time period is associated with performing a certain action, and bending the display twice in that defined time period is associated with performing another, different, action. The double bend flexing 400 described below is somewhat analogous to double clicking with a mouse on a graphical user interface.

The double bend flexing 400 begins with an unflexed flexible display 402. A user performs a first flexing by bending the unflexed flexible display 402 with a first left twist 420 and a first right twist 422 to create a first bent flexible display 404. The first bent flexible display 404 is similar to the convex display 204 described above.

After the flexible display is bent to create the first bent flexible display 404, the user causes the flexible display to return to an unflexed configuration by applying a second left twist 424 and a second right twist 426. After applying the second left twist 424 and the second right twist 426, the flexible display is in a configuration of a second unflexed display 406. The second unflexed display 406 is similar to the second unflexed display 208, discussed above. Some examples that accept double bend flexing do not respond to a single bend, as is illustrated for the unflexed flexible display 402, the first bent flexible display 404, and the second unflexed display 406, until a time period for double bend flexing elapses. This is similar to accepting a single click in a graphical user interface that accepts double mouse clicks.

After the flexible display has returned to the second unflexed display 406, a user performs a second flexing by applying a third left twist 428 and a third right twist 430 to create a second bent display 408. After creating the second bent display 408, a user applies a fourth left twist 432 and a fourth right twist 434 to create a second unflexed display 410. A user's performing the above described first flexing and second flexing within a defined time period for a double bend flexing causes, in some examples, an action to be taken that is different than an action that is initiated by a single bend of the flexible display.

The above description describes a second left twist 424, a second right twist 426, a fourth left twist 432 and a fourth right twist 434 to return the flexible display from a flexed configuration to an unflexed configuration. In some examples, the flexible display is constructed so as to return to an unflexed configuration in the absence of a twisting force. In such examples, a user is not required to provide the described twisting forces to return the flexible display to the unflexed configuration. In such examples, simply releasing forces that flex the flexible display will cause the flexible display to return to an unflexed configuration.

Double bend flexing is able to include combinations of a first flexing and a second flexing that include double convex bends of the flexible display, double concave bends of the flexible display or alternating convex and concave bends of the flexible displays. Different combinations of these bends are able to indicate that different actions should take place. The defined time period in which two bends are required to take place in order to indicate a double bend flexing as opposed to a pair of single bend flexings is able to be configured by the user or set by a design of a device.

Figure 5:
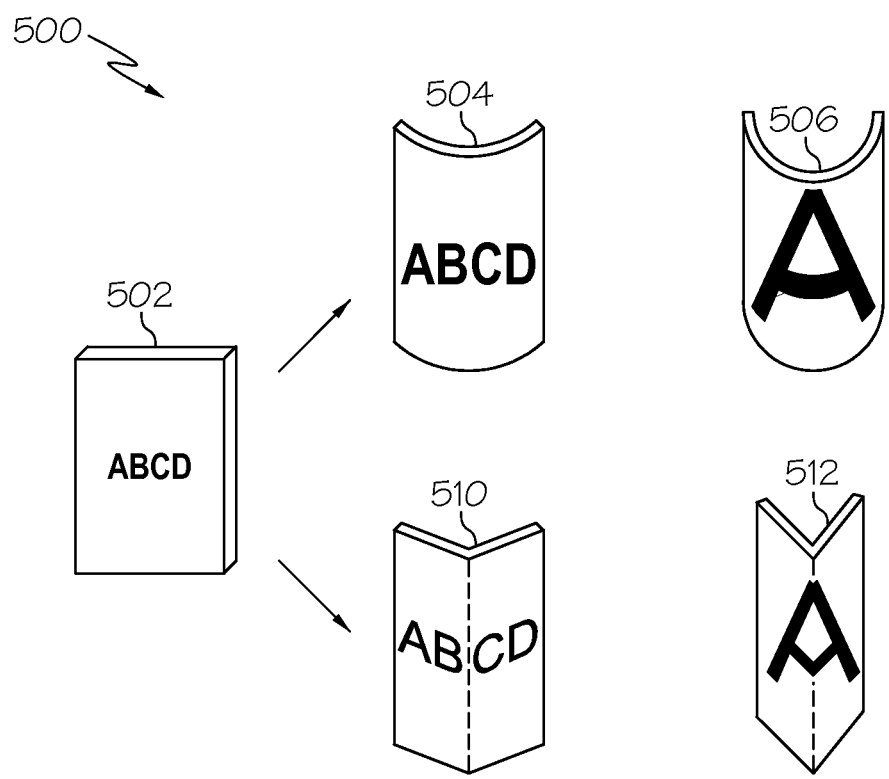
FIG. 5 illustrates a variable degree flexible display flexing, in accordance with one example.

FIG. 5 illustrates a variable magnitude flexible display flexing 500, in accordance with one example. The variable magnitude flexible display flexing 500 allows a user to indicate a degree or magnitude of an input by varying the magnitude of bending or folding of a flexible display.

The variable magnitude flexible display flexing 500 begins with an unflexed display 502 displaying text. A user is able bend the unflexed display 502 by a first magnitude to create a first bent display 504. A user is alternatively able to fold the unflexed display 502 by the first magnitude to create a first folded display 510. The text displayed in the first bent display 504 and the first folded display 510 is resized by being magnified with a degree of magnification related to the first magnitude of bending or folding.

The user is further able to bend the unflexed display 502 by a second magnitude to create a second bent display 506. A user is alternatively able to fold the unflexed display 502 by the second magnitude to create a second folded display 512. In this example, the second magnitude is greater than the first magnitude. The text displayed in the second bent display 506 and the second folded display 512 is resized by being magnified with a degree of magnification related to the second magnitude of bending or folding. Because the second magnitude of bending is greater than the first magnitude of bending, the degree of magnification of the image displayed on the second bent display 506 and the second folded display 512 is greater than the degree of magnification of the image displayed on the first bent display 504 and the second folded display 510.

Figure 6:
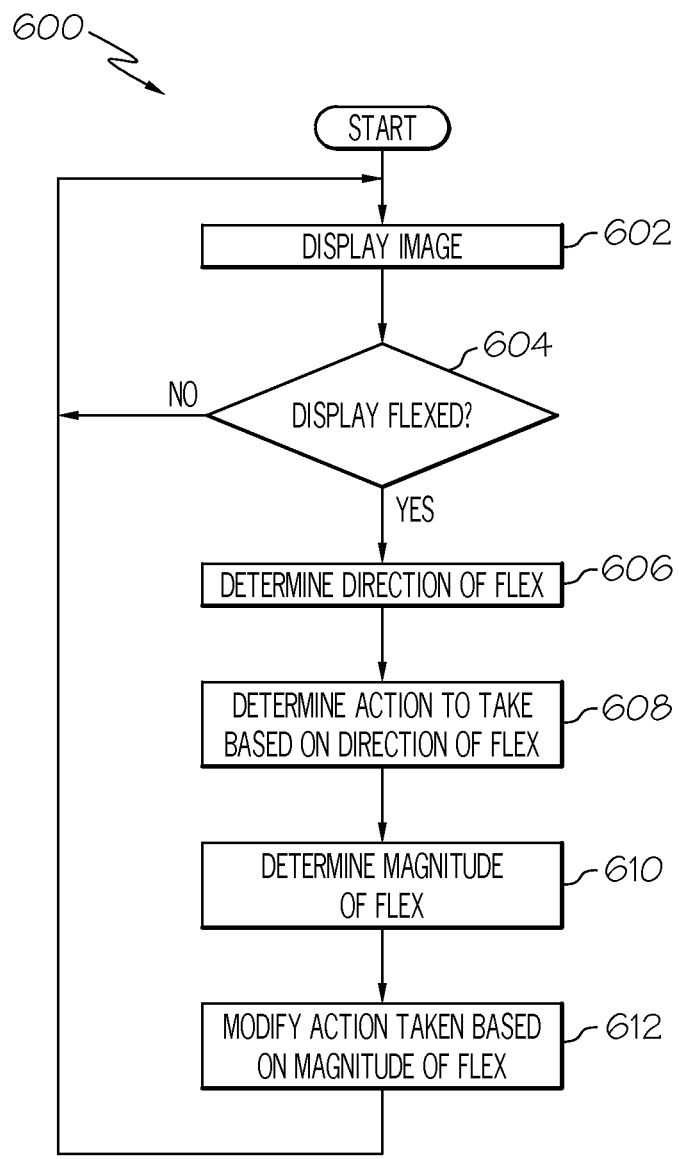
FIG. 6 illustrates a flexible display user input process, in accordance with one example.

FIG. 6 illustrates a flexible display user input process 600, in accordance with one example. The flexible display user input process 600 receives commands from a flexible display system, such as is described above with regards to FIG. 1. The flexible display user input process 600 begins by displaying, at 602, an initial presentation of an image. The process continues by determining, at 604, if the flexible display is flexed. If the flexible display is not flexed, the process returns to displaying the image, at 602.

If it is determined that the display is flexed, the process continues by determining, at 606, a direction of flex of the flexible display. After this determination, the process determines, at 608, an action to take based on the direction of flexing. In various examples, flexing in different directions causes different actions to be taken. For example, flexing a flexible display into a convex shape causes a displayed image to be magnified, while flexing a flexible display into a concave shape causes the displayed image to be reduced in size.

The process next determines, at 610, a magnitude of flexing of the flexible display. The process continues by modifying the action, as determined above at 608, that was taken based on the determined magnitude of flexing of the flexible display. As an example, flexing a flexible display to into a more convex form causes the displayed presentation of the image to be magnified to a greater degree. Similarly, in one example, flexing a flexible display into a more concave form causes the displayed presentation of the image to be reduced in size to a greater degree. The process then returns to displaying, at 602, the image.

Figure 7:
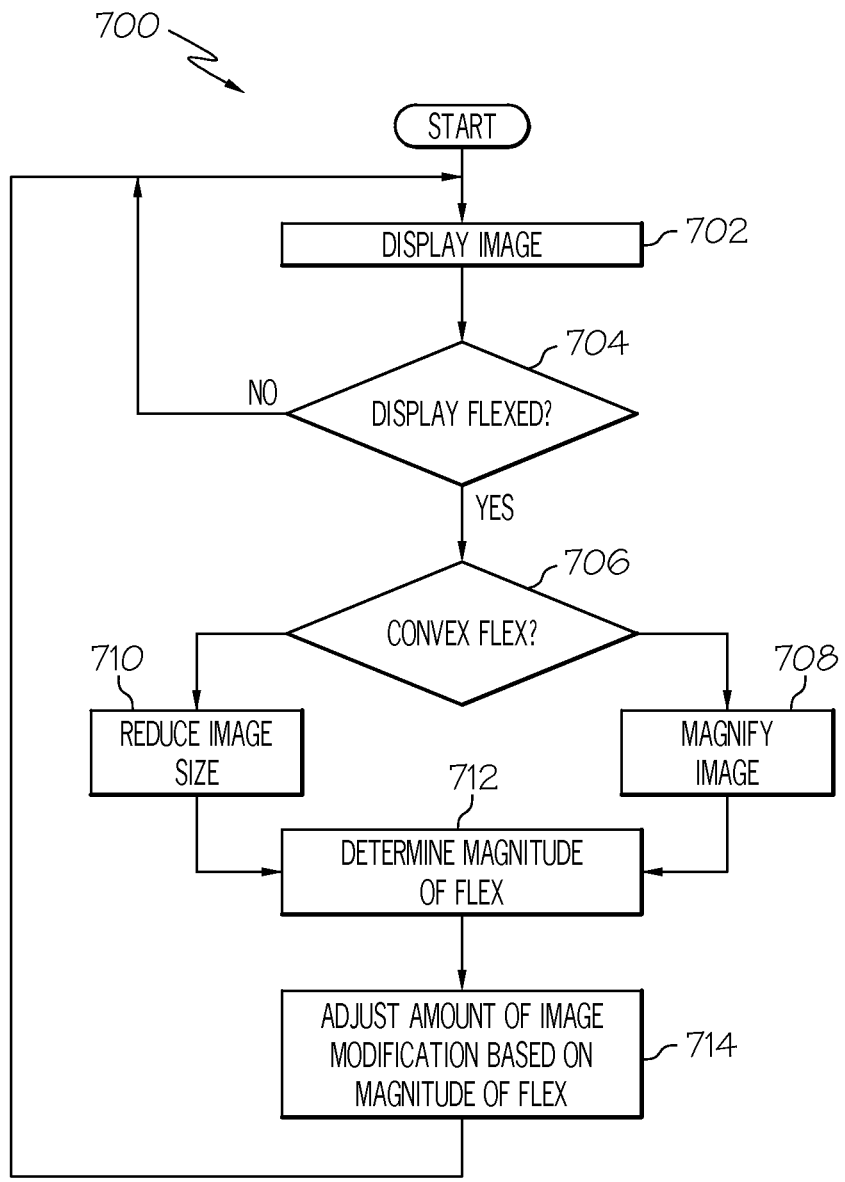
FIG. 7 illustrates a flexible display image magnify and reduction process, in accordance with one example.

FIG. 7 illustrates a flexible display image magnify and reduction process 700, in accordance with one example. The flexible display image magnify and reduction process 700 is an example of the above described flexible display user input process 600 whereby images displayed on a flexible display are resized by being magnified or reduced in size based on a bending of the flexible display. The flexible display image magnify and reduction process 700 begins by displaying, at 702, an image. The process continues by determining, at 704, if the flexible display is flexed. If the flexible display is not flexed, the process returns to displaying the image, at 702.

If it is determined that the display is flexed, the process continues by determining, at 706, if the flexible display is flexed into a convex form. If the flexible display is flexed into a convex form, the flexible display image magnify and reduction process 700 continues by magnifying, at 708, the displayed image. If the flexible display is not flexed in a convex form, it is assumed in this example that the flexible display is flexed into a concave form. In response to the flexible display being flexed into a concave form, the flexible display image magnify and reduction process 700 continues by reducing, at 710, the size of the displayed image.

The flexible display image magnify and reduction process 700 continues by determining, at 712, the magnitude of the flexing of the flexible display. The process continues by adjusting, at 714, the magnifying or reducing in size of the displayed image based on the determined magnitude of flexing of the flexible display. In particular, flexing the flexible display to into a more convex form causes the displayed image to be magnified to a greater degree. Similarly, flexing the flexible display into a more concave form causes the displayed image to be reduced in size to a greater degree. The process then returns to displaying, at 702, the image. As described above, the amount of image magnifying or size reducing performed by an incremental magnitude of flexing may be non-linear, such as a stepwise or progressively more "sensitive" to the flexing as the display is flexed farther from its unflexed configuration.

Figure 8:
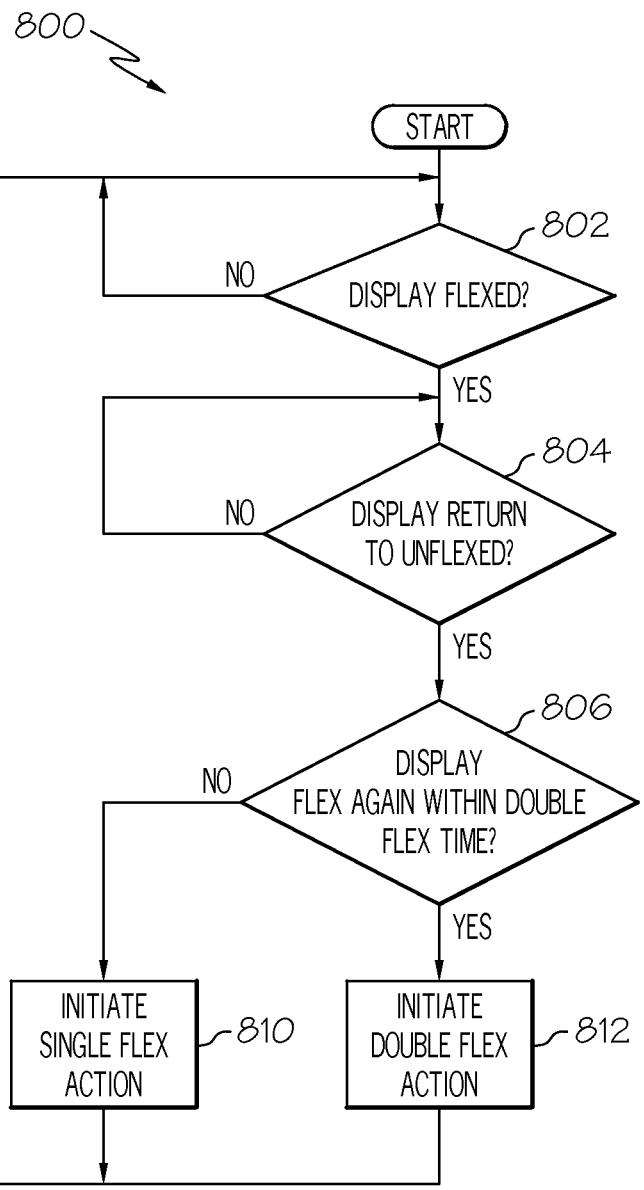
FIG. 8 illustrates a double flex input process, in accordance with one example.

FIG. 8 illustrates a double flex input process 800, in accordance with one example. The double flex input process 800 illustrates an example process to detect and react to a double flex flexing 400, described above. The double flex input process 800 beings by determining, at 802, if a flexible display is flexed. One example of this determination corresponds to detecting that a flexible display is changed from an unflexed flexible display 402 to a first bent flexible display 404 with the a first left twist 420 and the first right twist 422, described above with regards to FIG. 4. If such flexing is not determined, the processing returns to determining, at 802, if the flexible display is flexed.

If the flexible display is determined to have been flexed, the double flex input process 800 continues to determine, at 804, if the flexible display returns to an unflexed configuration. In one example, this corresponds to determining the change from first bent flexible display 404 to the second unflexed display 406 with the second left twist 424 and the second right twist 426. If it is not determined that the flexible display returned to an unflexed configuration, the double flex input process 800 returns to determining if the flexible display returns to a flat or unflexed configuration, at 804.

If it is determined that the flexible display returned to a flat or unflexed configuration, the double flex input process 800 determines, at 806, if the flexible display is flexed again within a defined double flex time period. A double flex time period is a time period in which a flexible display is to be flexed twice in order to result in causing an action that is associated with double flexing. This is similar to the time period in which a mouse is doubled clicked. In one example, if a double flexing of a display is not detected within the double flex time period, the action associated with a single flex is performed.

An example of determining if the flexible display is flexed again within the double flex time period is based on the actions described above with regards to the double bend flexing 400, where the processing detects the change in the flexible display from the second unflexed display 406 to the second bent display 408 by the fourth left twist 432 and a fourth right twist 434. In response to determining that the flexible display is flexed again within a defined double flex time period, the double flex input process 800 initiates, at 812, the action associated with a double flex. In response to determining that the flexible display is not flexed again within a defined double flex time period, the double flex input process 800 initiates, at 810, the action associated with a single flex.

It is to be understood that different directions and magnitudes of double flexing of the flexible display is able to be used to indicate different actions. For example, flexing a flexible display into two convex forms in a row within the double flex time period may indicate a "maximum magnification" action where the displayed image is magnified to a maximum amount as defined by a user preference or other suitable technique. Flexing the flexible display into two concave forms in a row within the double flex time period may indicate a "fit to display" action where the displayed image is reduced in size so as to be entirely displayed at once on the flexible display. A combination of flexing into a concave form followed by flexing into a convex form within the double flex time period may be analogized to "breaking" the displayed image and indicate, for example, deleting the data file containing the displayed image.

Figure 9:
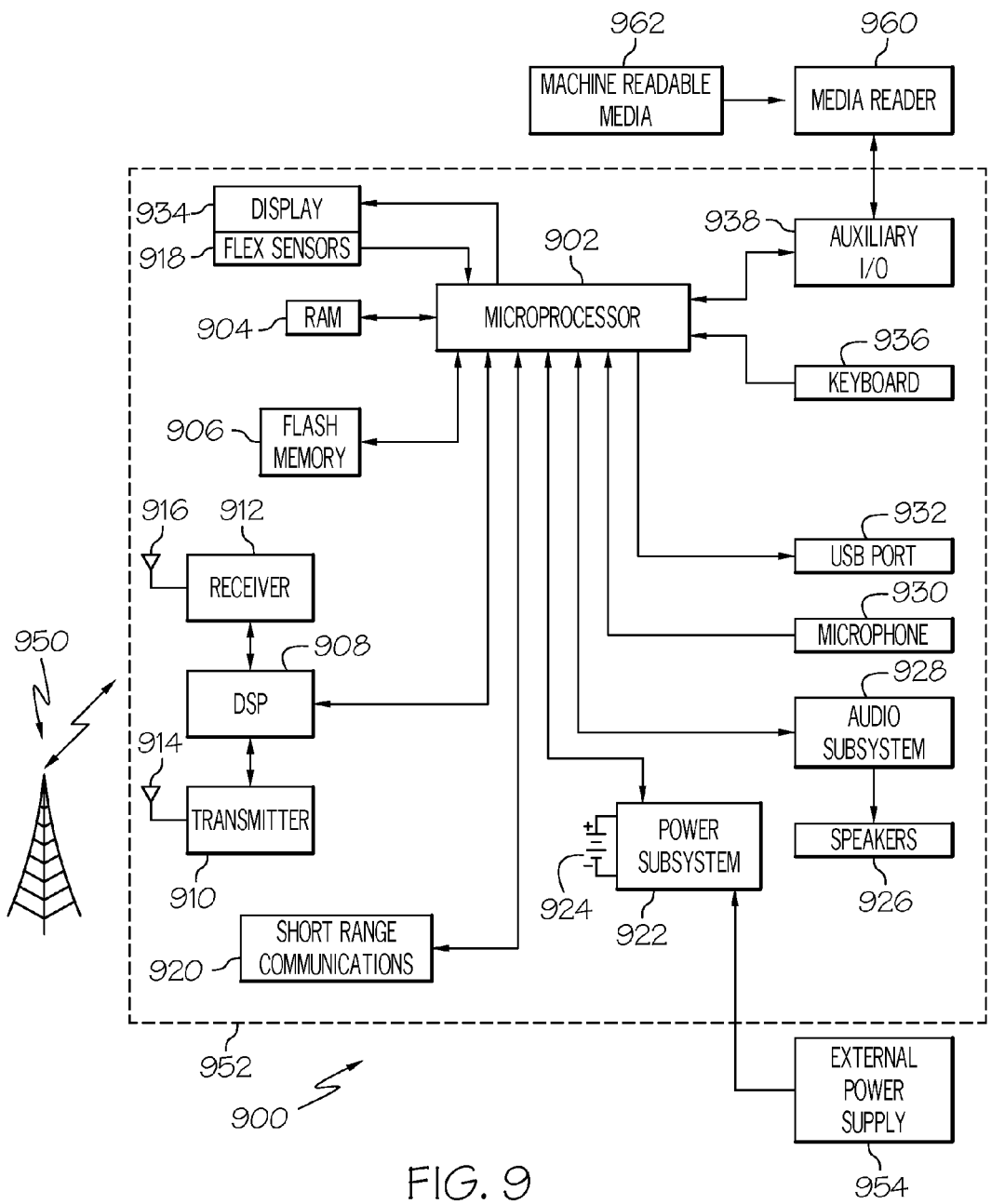
FIG. 9 is a block diagram of an electronic device and associated components in which the systems and methods disclosed herein may be implemented.

FIG. 9 is a block diagram of an electronic device and associated components 900 in which the systems and methods disclosed herein may be implemented. In this example, an electronic device 952 is a wireless two-way communication device that is able to provide one or both of voice and data communications capabilities. Such electronic devices communicate with a wireless voice or data network 950 via any suitable wireless communications protocol or protocols. Wireless voice communications are performed using either an analog or digital wireless communications protocols according to the network 950 to which it is connected. Data communications to and from the electronic device 952 support exchanging data with other computer systems through any suitable network, such as the Internet. Examples of electronic devices that are able to incorporate the above described systems and methods include data pagers, data messaging devices, cellular telephones, or a data communication device that may or may not include telephony capabilities.

The illustrated electronic device 952 is an example electronic wireless communications device includes two-way wireless communications component to provide wireless data communications with a wireless data network, a wireless voice network, or both. Such electronic devices incorporate communication subsystem elements such as a wireless transmitter 910, a wireless receiver 912, and associated components such as one or more antenna elements 914 and 916. A digital signal processor (DSP) 908 performs processing to extract data from received wireless signals and to generate signals to be transmitted. The particular design of the communication subsystem is dependent upon the communication network and associated wireless communications protocols with which the device is intended to operate.

Data communications with the electronic device 502 generally includes receiving data, such as a text message or web page download, through the receiver 912 and providing that received data to the microprocessor 902. The microprocessor 902 is then able to further process the received data for output to the display 934 or to other devices such as an auxiliary I/O device 938 or through the USB port 932. The electronic device 952 also allows a user to compose data items, such as e-mail messages, using the keyboard 936 in conjunction with the display 934 and possibly an auxiliary I/O device 938. Such composed items are then able to be transmitted over a communication network through the transmitter 910.

The electronic device 952 performs voice communications by providing received signals from the receiver 912 to the audio subsystem 928 for reproduction by speakers 926. A user's voice is able to be converted to electrical signals microphone 930. Those electrical signals are then transmitted via transmitter 910.

A short-range communications subsystem 920 is a further optional component which may provide for communication between the electronic device 952 and different systems or devices. For example, the short-range communications subsystem 920 may include an infrared device and associated circuits and components or a Radio Frequency based communication module such as one supporting Bluetooth® communications, to provide for communication with similarly-enabled systems and devices.

The electronic device 952 includes a microprocessor 902 that controls device operations for the electronic device 952. The microprocessor 902 interacts with the above described communications subsystem elements to implement and control wireless communications with the network 950. The microprocessor 902 further performs control and data exchange functions by interacting with, for example, flash memory 906, random access memory (RAM) 904, auxiliary input/output (I/O) device 938, USB Port 932, display 934, flex sensors 918, keyboard 936, audio subsystem 928, microphone 930, a short-range communications subsystem 920, a power subsystem 922, and any other device subsystems.

The display 934 of one example is a flexible display and is physically connected to flex sensors 918 as is described above. Display 934 is able to further include touch sensors to accept touch screen inputs from a user, such as scrolling gestures, and the like. The keyboard 936 is able to include, for example, a complete alphanumeric keyboard, a telephone-type keypad, or a touch screen representation of a keyboard.

An internal power pack, such as a battery 924, is connected to a power subsystem 922 to provide power to the circuits of the electronic device 952. The power subsystem 922 includes power distribution circuitry to supply electric power to the various components of the electronic device 952 and also includes battery charging circuitry to support recharging the battery 924. An external power supply 954 is able to be connected to the power subsystem 922. The power subsystem 922 includes a battery monitoring circuit that provide a status of one or more battery conditions, such as remaining capacity, temperature, voltage, current draw, and the like.

The USB port 932 provides data communication between the electronic device 952 and one or more external devices. Data communication through USB port 932 enables various user data, such as data files or configuration parameters for the electronic device 952 to be exchanged between the electronic device 952 and an external device. The USB port 932 is also able to be used to convey external power to the power subsystem 922 from a suitable external power supply.

Operating system software used by the microprocessor 902 is stored in flash memory 906. In addition to, or in place of, flash memory 906, a battery backed-up RAM or other non-volatile storage data elements are able to store operating systems, other executable programs, or both. As an example, a computer executable program configured to perform the flexible display user input process 600, the flexible display image magnify and reduction process 700, and the double flex input process 800, described above, is included in a software module stored in flash memory 906.

RAM memory 904 is used to store data produced or used by microprocessor 902. RAM memory is further able to temporarily store program data from flash memory 906 or from other storage locations. RAM 904 is also used to store data received via wireless communication signals or through wired communications.

The microprocessor 902 in some examples executes operating system software as well as various other software applications such as user applications, small, special purpose applications referred to as "apps," and the like. Some software, such as operating system and other basic user functions such as address books, personal information managers (PIMs), e-mail applications and the like, are able to be provided as part of the manufacturing process for the electronic device.

In addition to loading applications as part of a manufacturing process, further applications are able to be loaded onto the electronic device 952 through, for example, the wireless network 950, an auxiliary I/O device 938, USB port 932, short-range communications subsystem 920, or any combination of these interfaces. Once these applications are loaded into the electronic device 952, these applications are executed by the microprocessor 902.

A media reader 960 is able to be connected to an auxiliary I/O device 938 to allow, for example, loading computer readable program code of a computer program product into the electronic device 952 for storage into flash memory 906. One example of a media reader 960 is an optical drive such as a CD/DVD drive, which may be used to store data to and read data from a computer readable medium or storage product such as computer readable storage media 962. Examples of suitable computer readable storage media include optical storage media such as a CD or DVD, magnetic media, or any other suitable data storage device. The media reader 960 is alternatively able to be connected to the electronic device through the USB port 932 or computer readable program code is alternatively able to be provided to the electronic device 952 through the wireless network 950.

Information Processing System

The subject matter of the present disclosure can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The subject matter of the present disclosure can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments have been disclosed, those having ordinary skill in the art will understand that changes can be made to the specific embodiments without departing from the spirit and scope of the present disclosure. The scope of the subject matter contained in the present disclosure is not to be restricted, therefore, to the specific embodiments, and it is intended that the appended claims cover any and all such applications, modifications, and embodiments within the scope of the present disclosure.

What is claimed is:

1. A flexible display command receiving system, comprising:
   a flexible display;
   at least one flexing sensor configured to characterize flexings of the flexible display; and
   a display controller, communicatively coupled to the at least one flexing sensor, the display controller configured to:
      provide an initial presentation of an image on the flexible display;
      receive a characterization of a first flexing at a location of the flexible display away from an unflexed configuration;
      receive, within a defined time period after receiving the characterization of the first flexing, a characterization of a return of the flexible display to the unflexed configuration;
      receive, within the defined time period after receiving the characterization of the first flexing and after receiving the characterization of the return, a characterization of a second flexing at the location of the flexible display away from the unflexed configuration, the first flexing being separate from the second flexing; and
      resize in a first manner, in response to receiving the characterization of the first flexing and in response to receiving the characterization of the second flexing within the defined time period after receiving the first flexing, a portion of the initial presentation to create a modified display, wherein the modified display comprises a resized representation of the portion of the initial presentation, wherein the portion of the initial presentation is adjacent to and removed from the location.

2. The flexible display command receiving system of claim 1, wherein at least one of the first flexing and the second flexing comprises a convex flexing, and wherein the display controller is configured to magnify the portion in response to receipt of the convex flexing.

3. The flexible display command receiving system of claim 1, wherein the display controller is further configured to:
   present, after resizing and after receiving the characterization of the return of the flexible display to the unflexed configuration, the modified display;
   detect, after presenting the modified display and based on the characterization of the flexing, a reset flexing of the flexible display; and
   display the initial presentation in its original size in response to detecting the reset flexing.

4. The flexible display command receiving system of claim 1, wherein the display controller is configured to resize the portion in a second manner in response to the first flexing when a double flexing is not detected within the defined time period, the first manner being different than the second manner.

5. The flexible display command receiving system of claim 1, wherein the display controller is further configured to:
   receive a scrolling command; and
   scroll the initial presentation across the flexible display in response to receiving the scrolling command in order to create a presentation of a scrolled image on the flexible display,
   wherein the at least a portion of the initial presentation comprises a portion of the scrolled image located in proximity to a location of one of the first flexing and the second flexing.

6. The flexible display command receiving system of claim 1, further comprising:
   a processor, communicatively coupled to the flexible display, the at least one flexing sensor, and the display controller;
   a memory, communicatively coupled to the processor, configured to store information operated upon by the processor; and
   a wireless communications component configured to provide wireless data communications between the processor and a wireless data network.

7. A method for receiving commands from a flexible display system, the method comprising:
   providing an initial presentation of an image on the flexible display;
   determining a first flexing at a location of the flexible display away from an unflexed configuration;
   determining, within a defined time period after determining the first flexing, a return of the flexible display to the unflexed configuration;

determining, within the defined time period after determining the first flexing and after determining the return, a second flexing at the location of the flexible display away from the unflexed configuration, the first flexing being separate from the second flexing; and resizing in a first manner, in response to determining the first flexing and in response to determining the second flexing within the defined time period after determining the first flexing, a portion of the initial presentation to create a modified display, wherein the modified display comprises a resized representation of the portion of the initial presentation, wherein the portion of the initial presentation is adjacent to and removed from the location.

8. The method of claim 7, wherein at least one of the first flexing and the second flexing comprises a convex flexing, and wherein the resizing comprises magnifying the portion in response to the convex flexing.

9. The method of claim 7, further comprising:
presenting, after the resizing and after the determination of the return of the flexible display to the unflexed configuration, the modified display;
detecting, after presenting the modified display, a reset flexing of the flexible display; and
displaying the initial presentation in its original size in response to detecting the reset flexing.

10. The method of claim 7, further comprising resizing the initial presentation of the image in a second manner in response to the first flexing when a double flexing is not detected within the defined time period, the first manner being different than the second manner.

11. The method of claim 7, further comprising:
receiving a scrolling command; and
scrolling the initial presentation across the flexible display in response to receiving the scrolling command in order to create a presentation of a scrolled image on the flexible display,
wherein the at least a portion of the initial presentation comprises a portion of the scrolled image located in proximity to a location of one of the first flexing and the second flexing.

12. A computer program product for receiving commands from a flexible display system, the computer program product comprising:
a non-transitory computer readable storage medium having computer readable program code embodied therewith, the computer readable program code comprising instructions for:
providing an initial presentation of an image on the flexible display;
determining a first flexing at a location of the flexible display away from an unflexed configuration;
determining, within a defined time period after determining the first flexing, a return of the flexible display to the unflexed configuration;
determining, within the defined time period after determining the first flexing and after determining the return, a second flexing at the location of the flexible display away from the unflexed configuration, the first flexing being separate from the second flexing; and
resizing in a first manner, in response to determining the first flexing and in response to determining the second flexing within the defined time period after determining the first flexing, a portion of the initial presentation to create a modified display, wherein the modified display comprises a resized representation of the portion of the initial presentation, wherein the portion of the initial presentation is adjacent to and removed from the location.

13. The computer program product of claim 12, wherein at least one of the first flexing and the second flexing comprises a convex flexing, and wherein the resizing comprises magnifying the portion in response to the convex flexing.

14. The computer program product of claim 12, the computer readable program code further comprising instructions for:
presenting, after the resizing and after determining the return of the flexible display to the unflexed configuration, the modified display;
detecting, after presenting the modified display, a reset flexing of the flexible display; and
displaying the initial presentation in its original size in response to detecting the reset flexing.

15. The computer program product of claim 12, the computer readable program code further comprising instructions for resizing the initial presentation of the image in a second manner in response to the first flexing when a double flexing is not detected within the defined time period, the first manner being different than the second manner.

16. The computer program product of claim 12, the computer readable program code further comprising instructions for:
receiving a scrolling command; and
scrolling the initial presentation across the flexible display in response to receiving the scrolling command in order to create a presentation of a scrolled image on the flexible display,
wherein the at least a portion of the initial presentation comprises a portion of the scrolled image located in proximity to a location of one of the first flexing and the second flexing.

17. The flexible display command receiving system of claim 1, the display controller further configured to:
detect a delete flexing command by:
receiving a characterization of a third flexing at a second location of the flexible display away from an unflexed configuration;
receiving, within a defined time period after receiving the characterization of the third flexing, a characterization of a return of the flexible display to the unflexed configuration; and
receiving, within the defined time period after receiving the characterization of the first flexing and after receiving the characterization of the return, a characterization of a fourth flexing at the second location of the flexible display away from the unflexed configuration, the third flexing being separate from the fourth flexing; and
delete, based on a detection of the delete flexing command, a file associated with the image.

18. The flexible display command receiving system of claim 17, wherein:
the third flexing comprises one of a convex flexing and a concave flexing,
the fourth flexing comprises another of a convex flexing and a concave flexing, the second flexing being in an opposite direction from the first flexing.

19. The flexible display command receiving system of claim 1, wherein the display controller is further configured to resize the portion of the initial presentation independently of a selection of an input selecting a location of the portion of the initial presentation.

* * * * *